(12) United States Patent
Sonksen et al.

(10) Patent No.: US 8,977,786 B1
(45) Date of Patent: Mar. 10, 2015

(54) METHOD AND SYSTEM FOR PROCESSING INFORMATION AT PERIPHERAL DEVICES

(71) Applicant: QLOGIC, Corporation, Aliso Viejo, CA (US)

(72) Inventors: Bradley S. Sonksen, Rancho Santa Margarita, CA (US); Richard S. Moore, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

(21) Appl. No.: 13/954,661

(22) Filed: Jul. 30, 2013

(51) Int. Cl.
*G06F 3/00* (2006.01)
*G06F 13/00* (2006.01)
*G06F 13/10* (2006.01)

(52) U.S. Cl.
CPC .................................. *G06F 13/10* (2013.01)
USPC ............... 710/33; 710/29; 709/212; 709/232; 713/1; 713/2

(58) Field of Classification Search
None
See application file for complete search history.

(56) References Cited

U.S. PATENT DOCUMENTS

| 8,543,747 | B2* | 9/2013 | Zhu et al. ....................... 710/105 |
| 2003/0046460 | A1* | 3/2003 | Inoue et al. ..................... 710/38 |
| 2007/0168748 | A1* | 7/2007 | Musoll ............................ 714/38 |
| 2008/0065796 | A1* | 3/2008 | Lee et al. ........................ 710/71 |
| 2010/0318703 | A1* | 12/2010 | Zhu et al. ...................... 710/105 |
| 2012/0287944 | A1* | 11/2012 | Pandit et al. .................. 370/474 |
| 2013/0195210 | A1* | 8/2013 | Swarbrick et al. ............ 375/259 |
| 2014/0219276 | A1* | 8/2014 | Jokinen et al. ................ 370/392 |

* cited by examiner

*Primary Examiner* — Michael Sun
(74) *Attorney, Agent, or Firm* — Klein, O'Neill & Singh, LLP (57) ABSTRACT

Methods and device coupled to a computing device and a network device are provided. A first module receives a first packet and a second packet via a same single data path from the computing device. A second module receives the first packet at a first buffer via a first path and the second packet at a second buffer via a second path. The first module uses a steering mechanism to steer the first packet in the first path and the second packet in the second path. The second module uses an arbitration module to select the first packet and the second packet for maintaining an order in which the first packet and the second packet are received and for sending the first packet and the second packet to a third module for further processing.

18 Claims, 12 Drawing Sheets

METHOD AND SYSTEM FOR PROCESSING INFORMATION AT PERIPHERAL DEVICES

TECHNICAL FIELD

This disclosure is related to computing system and devices.

BACKGROUND

Computing systems are commonly used today. A computing system often communicates with a peripheral device for performing certain functions, for example, reading and writing information. Continuous efforts are being made to improve communication between computing systems and peripheral devices.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Figure 1A:
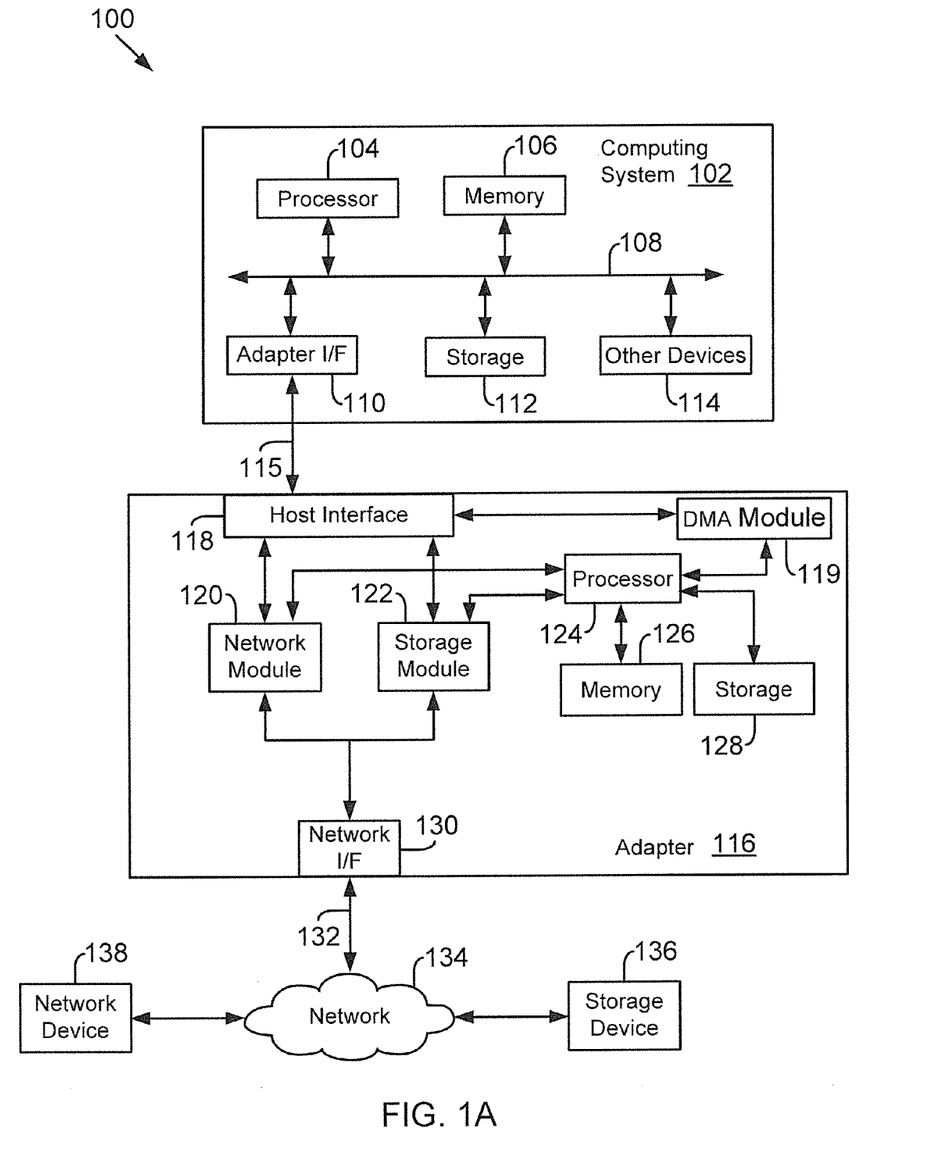
FIG. 1A is a functional block diagram of a system, used according to one embodiment.

FIG. 1A is a block diagram of a system 100 configured for use with the present embodiments. The system 100 may include one or more computing system 102 (may also be referred to as "host system 102" or server 102) coupled to another device via a link 115, for example, an adapter 116 that interfaces with a network 134 via a network link 132. The network 134 may include, for example, additional computing systems, servers, storage systems and other devices. It is noteworthy that although the description below is based on the interaction between adapter 116 and host system 102, the embodiments disclosed herein are not limited to any particular device type.

The computing system 102 may include one or more processor 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an inter-connect (may also be referred to as a computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information. Link 115 may be an interconnect system, for example, a PCI-Express (PCIe) bus or any other interconnect type. The computing system 102 also includes other devices and interfaces 114, which may include a display device interface, a keyboard interface, a pointing device interface and others. Details regarding other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage device 112 may be used to store operating system program files, application program files, and other files. Some of these files are stored on storage 112 using an installation program. For example, the processor 104 may execute computer-executable process steps of an installation program so that the processor 104 can properly execute the application program.

Memory 106 also interfaces with the computer bus 108 to provide processor 104 with access to memory storage. Memory 106 may include random access main memory (RAM) or any other memory type. When executing stored computer-executable process steps from storage 112, processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between higher than 100 Mbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage and network technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed Gigabit Ethernet networks while preserving the Fibre Channel protocol. The adapter 116 shown in FIG. 1A may be configured to operate as an FCOE adapter and may be referred to as FCOE adapter 116 or a converged network adapter 116. The illustrated adapter 116, however, does not limit the scope of the present embodiments. The present embodiments may be practiced with adapters having different configurations.

Referring back to FIG. 1A, adapter 116 interfaces with the computing system 102 via the link 115 and a host interface 118. In one embodiment, the host interface 118 may be a PCI-Express interface having logic/circuitry for sending and receiving PCI-Express packets described below in detail.

The adapter 116 may also include a processor (or more than one processor) 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels (or requestors) (168A-168N, FIG. 1C) for transferring data via link 115. The DMA channels are typically used to move control structures such as input/output control blocks (IOCBs), input/output status blocks (IOSBs) and data between host system memory 106 and the adapter memory 126.

Figure 1B:
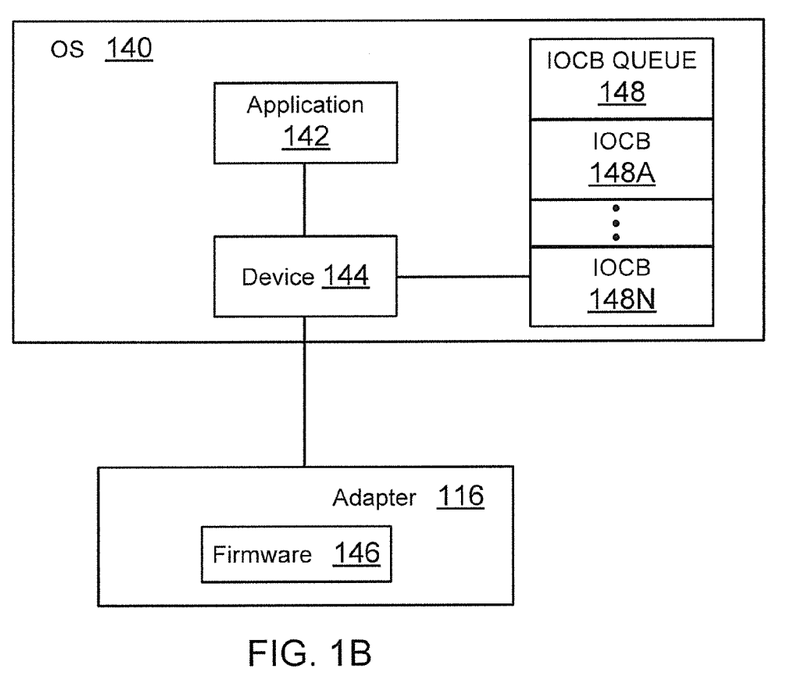
FIG. 1B shows an example of an architecture, used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command (I/O request) to a driver 144 for performing an operation, for example, reading and/or writing data at another storage device. The driver 144 processes the request and communicates with firmware 146 executed by processor 124 of adapter 116. A component of adapter 116 then processes the request.

Typically for managing data transfers across link 115, the following process steps are typically used: an IOCB is first generated by the driver 144 in response to an I/O request and saved at an IOCB queue 148, as one of 148A-148N. The IOCB queue 148 may be at host memory 106 or any other location. The IOCB is obtained by adapter 116 by a DMA operation via link 115 initiated by a DMA requestor. The IOCB may be to provide data to host processor 104 or to send data provided by host processor 104. For a write operation, an IOCB typically includes an "address" of host memory 106 where data that needs to be sent is stored and a "length" that indicates the amount of data that needs to be transferred. Both IOCB fetch and data transfer operations are performed using DMA operations via the DMA channels. Based on the IOCB, adapter 116 executes the operations that may be needed.

Figure 1C:
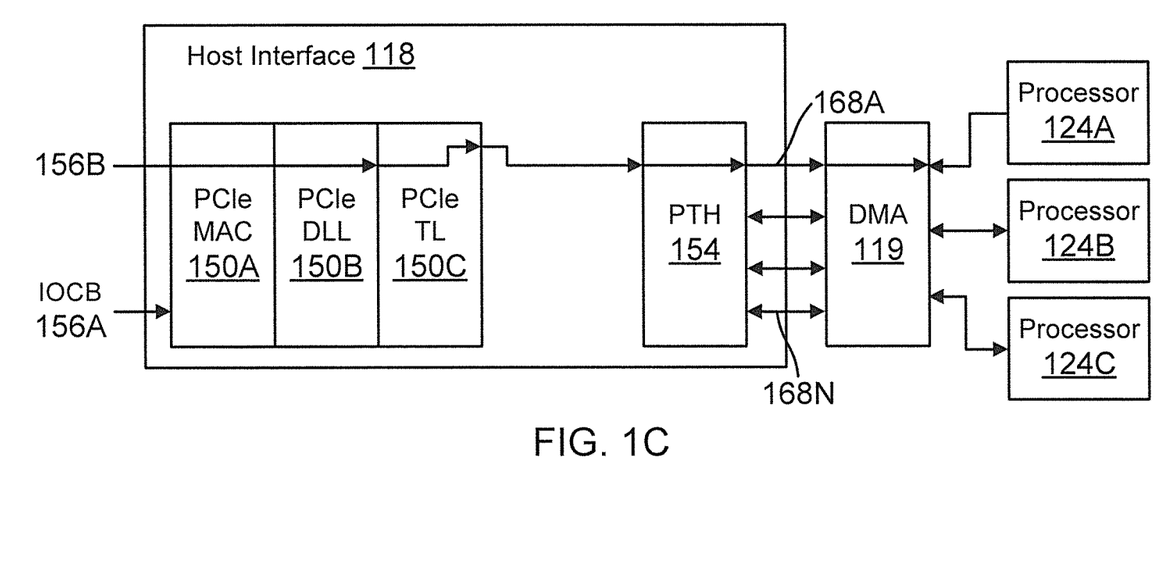
FIG. 1C shows an example of receiving a packet at a host interface of a device, according to one embodiment.

Adapter 116 then uses a DMA operation to send a status block (IOSB) to processor 104 indicating the completion of IOCB execution and associated data transfer. The adapter 116 then sends an interrupt message to the host processor 104 to indicate completion of IOCB execution and posting of the IOSB status in the host system memory 106 so that it can process IOSBs and notify application 142 of the completion of the data transfer process FIG. 1C shows a system for obtaining data from host memory 106 via host interface 118, according to one embodiment. Host interface 118 may include a PCIe media access control (MAC) layer (also referred to as PHY or PHY layer) 150A for receiving and sending messages via link 115. Host interface 118 may also include a PCIe data link layer (referred to as DLL) 150B between a PCIe transaction layer (referred to as TL) 150C and PHY 150A. Details regarding DLL 150B and TL 150C are provided below.

Host interface 118 also includes a PCI-Express Transaction Handler (PTH) 154 that interfaces with the DMA module 119 and TL 150C to send and receive information via link 115. PTH 154 performs various functions including error checking and others.

PCI-Express uses a packet-based protocol to exchange information between TL 150A and a TL (not shown) at the adapter interface 110. The packets may be referred to as TLP i.e. transaction layer packets. TLPs are used to communicate transactions, such as read and write and other type of events. Transactions are carried out using requests and completions. Completions are used only when required, for example, to return read data or to acknowledge completion of a request. On the transmit side (i.e. TLPs to processor 104 from adapter 116), packets flow from the TL 150C to PHY 150A. On the receive side (i.e. TLPs to adapter 116 from processor 104), TLPs are processed by the PHY layer 150A and sent to TL 150C for processing. TL 150C assembles and disassembles TLPs.

The system of FIG. 1C shows more than one processor 124 (labeled as 124A-124C) for adapter 116. The embodiments described herein are not limited to any particular number of processors. Processors 124A-124C interface with the DMA module 119 to send and receive data and messages via link 115.

As described above, driver 144 generates an IOCB for an I/O request to send data via network link 132 to a destination. The IOCB is placed at the IOCB queue 148. The IOCB (for example, 156A) is then retrieved by adapter 116 and provided to one of the processors, for example, 124A for further processing. The processor 124A then programs a DMA channel (for example, 168A) to obtain data from host memory 106 via path 156B. Once data is received it is transmitted via network link 132 to its destination.

As operating speeds increase for adapter 114, there may be a need to operate on multiple TLPs in a single clock cycle. Conventional adapters and devices are designed for handling one TLP at a time. The embodiments described herein handle multiple TLPs in an efficient manner using multiple paths.

Figure 1D:
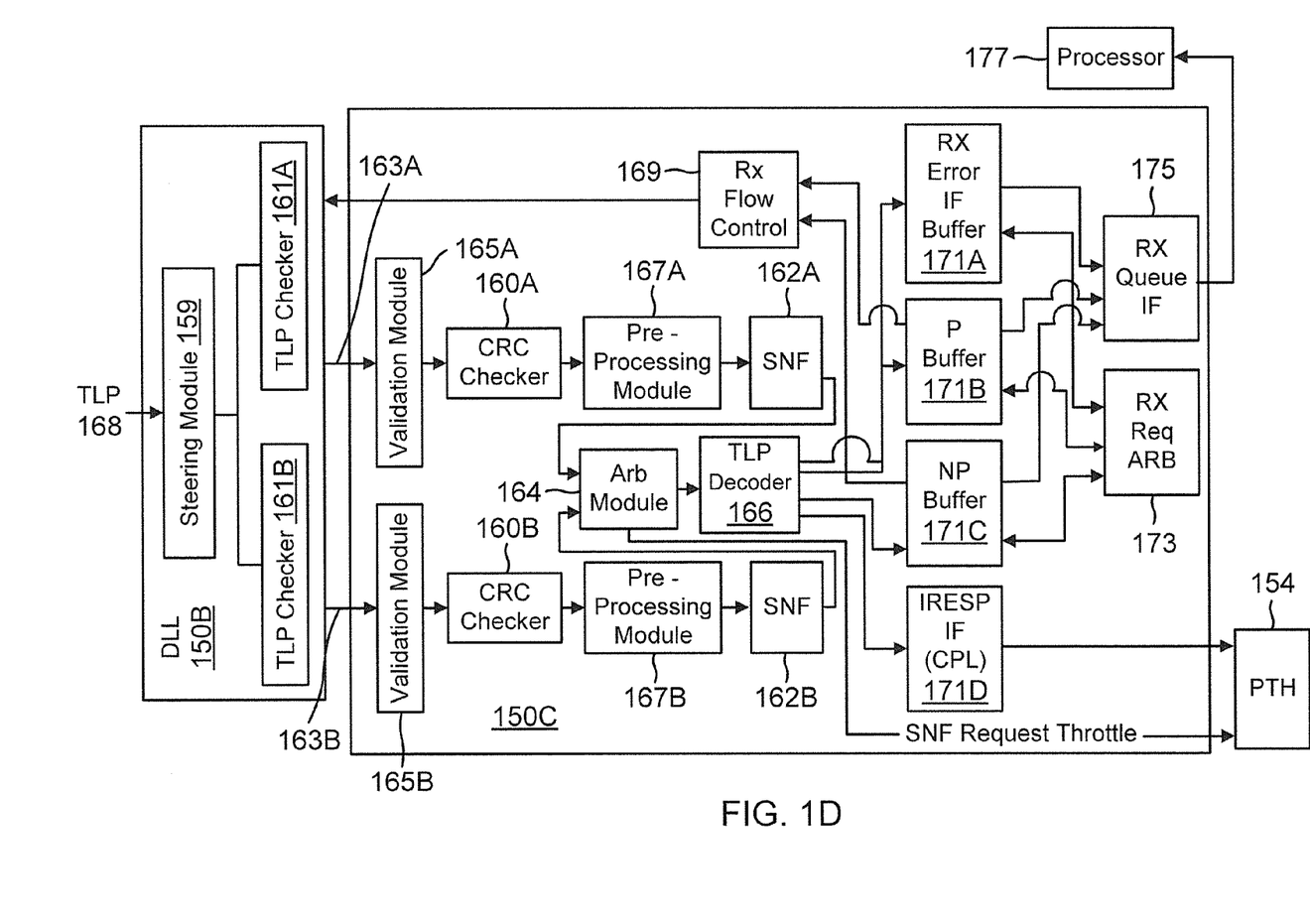
FIG. 1D shows a detailed block diagram of transaction layer, according to one embodiment.

FIG. 1D shows an example of DLL 150A and TL 150C used according to one embodiment. DLL 150B includes a steering module 159 that receives a plurality of TLPs shown as 168. The steering module 159 routes each TLP via path 163A or 163B, as described below in detail. DLL 150B includes a TLP checker 161A and 161B for each path 163A and 163B, respectively. When a first TLP is received it may be sent via path 163A or 163B. When a next TLP is received, it is sent by the other i.e. the path that was not used for the first TLP. The "ping-pang" scheme is used to transfer TLPs faster to TL 150C, as described below in detail.

TL 150C includes a validation module 165A and 165B for each path 163A and 163B, respectively. Each validation module is used to validate a TLP that is received at any given time. TL 150C further includes a cyclic redundancy code (CRC) checker 160A for path 163A and 160B for path 163B, respectively. The CRC checkers 160A and 160B check the CRC for incoming TLPs.

After the CRC of a TLP is checked, the TLP is staged at a pre-processing module 167A and 167B. The pre-processing module 167A and 167B pre-process the TLPs before storing them at a store and forward (SNF) buffer; for example, SNF buffer 162A for path 163A and SNF buffer 162B for path 163B, respectively. The SNF buffers are temporary memory storage devices that are used to store TLPs, TLP headers and TLP validation information as described below. The TLPs are read out from the SNF buffers by an arbitration module 164 using a "ping-pong" scheme. The arbitration module 164, described below in detail ensures that the proper TLP is being read to make sure that the order in which TLPs are received using at least two paths can be maintained. The TLPs are read out and provided to a TLP decoder 166 that decodes the TLPs and provides the TLPs to PTH 154 for further processing, depending on the TLP type.

As an example, a TLP may be a posted (P) request, a non-posted (NP) request or a completion. A P request means a request that does not require completion. A P request may be generated by a host system processor, or any other module of adapter 116. An example of a P request may be a message that does not require completion or a write operation that may not require a completion. An NP means a request that requires a completion. For example, a NP request may be a command that needs a configuration change or a request to read information. A completion TLP (Cpl) is a completion indicator received from the host system for a previous request. The embodiments disclosed herein are not limited to any particular TLP type (i.e. requests or completion).

A P TLP is placed at a P buffer 171B, a NP TLP is placed at a NP buffer 171C, while a Cpl TLP is placed at buffer 171D. Any error TLPs are placed at an error buffer 171A. Information from buffers 171A, 171B and 171C are selected by a request arbitration module 173 and sent to PTH 154 or to processors 177 (similar to processors 124A-124C). The information to processor 177 is sent via a receive queue interface 175, while the completions from buffer 171D are sent to PTH 154 directly.

TL 150C also includes a receive side flow control module 169 that generates credits for P buffer 171B and NP Buffer 171C for controlling traffic received via link 115. The credits indicate to other modules (for example, processor 104) the amount of space that may be available to store information at the various buffers of TL 150C. The flow control mechanism may be defined by the PCI-Express standard.

Figure 1E:
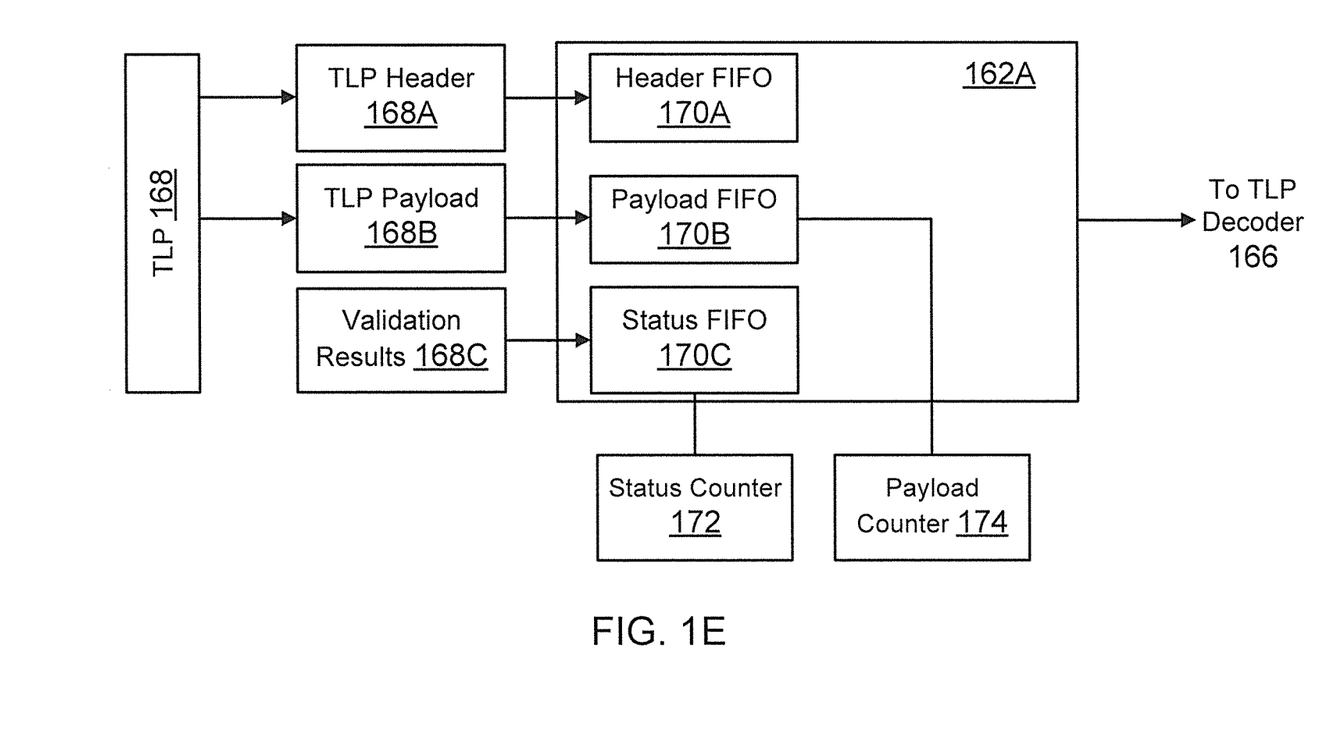
FIG. 1E shows an example of a buffer for processing packets at a device, according to one embodiment.

FIG. 1E shows a block diagram of SNF 162A, according to one embodiment. The details of SNF 162B are similar to 162A. A TLP 168 received from DLL 150B may include a TLP header 168A and a TLP payload 168B. The TLP 168 is validated by a TLP checker as described above and the validation results 168C are also received from DLL 150B. The TLP header 168A is stored at a header storage module 170 (shown as header FIFO) of SNF 162A. The TLP payload 168E is stored at a payload storage module (shown as payload FIFO 170B) of SNF 162A. The validation results 168C are stored at a status storage module 170C (shown as status FIFO 170C) of SNF 162A. A status counter 172 maintains the status count for incoming TLPs, while the payload counter 174 maintains a count of all the payload of the TLPs received from DLL 150B.

Figure 1F:
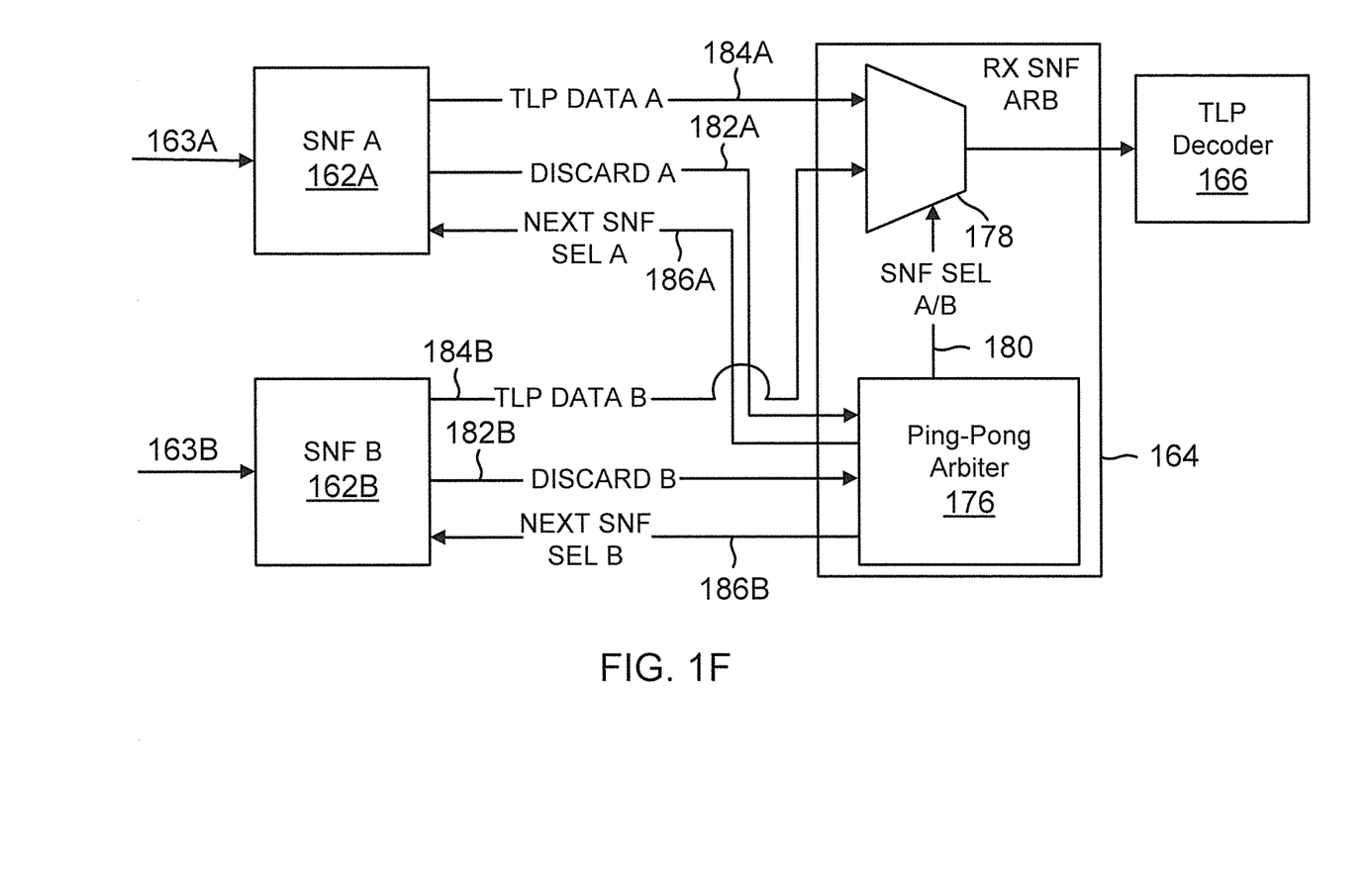
FIG. 1F shows a system used by the host interface for selecting packets for processing, according to one embodiment.

FIG. 1F shows a block diagram of a system for using a "ping-pong" methodology to select TLPs received via paths 163A and 163B and stored at SNFs 162A and 162B, according to one embodiment. The system of FIG. 1F includes the arbitration module 164 having an arbiter 176 and a multiplexer 178. The arbiter 176 sends a signal 180 to Mux 178 to select either the TLP data from SNF 162A or 162B. Signals 186A and 186B are used to read TLP data from SNFs 162A and 162B in an alternating manner such that TLPs received via dual data paths 163A and 163B converge to provide a single data path to the TLP decoder 166 for further processing. For example, if arbiter selects TLP data A in the first instance, it then selects TLP data B in the next instance to maintain the order in which TLPs were received via paths 163A and 163B.

When the status FIFO 170C indicates an error for a TLP, then signals 182A and/or 182B are provided to the arbiter 176 to discard a TLP at SNF 162A and/or 162B, respectively. TLP data from the affected SNF are not passed for further processing. However, valid TLP data is read immediately from the other SNF because the defective TLP is not passed on by Mux 178. For example, if TLP data A is discarded by Mux 178 based on a status FIFO 170 indicator, then TLP data A is not passed on to TLP decoder 166. The arbiter 176 can immediately begin reading TLP data B from SNF 162B because it knows that TLP data A is not being sent. This is efficient and saves time.

In one embodiment, TLP processing is efficient because TLPs are received via two data paths from DLL 150E and then efficiently stored at SNFs 162A and 162B. This allows multiple TLPs to be processed within a single clock cycle. TLP ordering is also preserved because arbiter 176 uses the alternate ping-pong methodology.

Figure 2A:
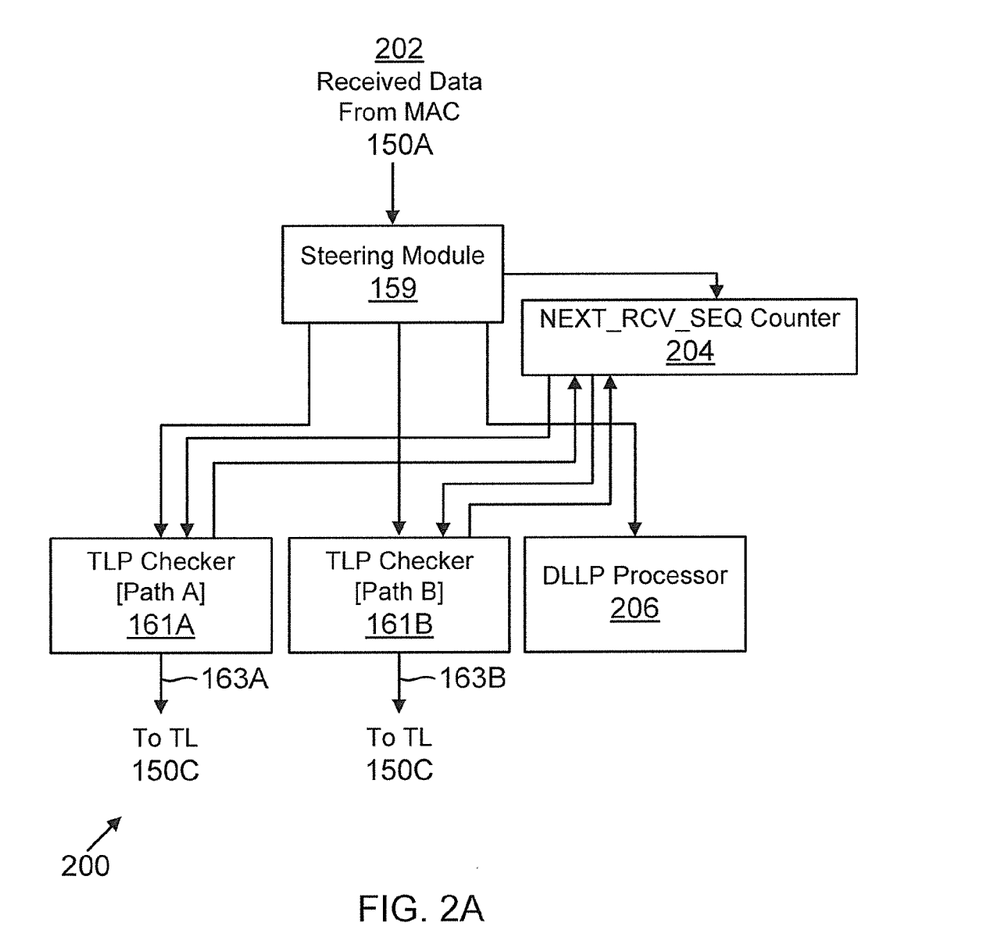
FIG. 2A shows a system with a steering module for selecting packets, according to one embodiment.

FIG. 2A shows a system 200 used by DLL 150B to process and sending TLPs via paths 163A and 163B to TL 150C, according to one embodiment. DLL 150B receives data 202 from MAC 150A. The data is provided to a steering module 159 that steers data to the first TLP checker 161A for path 163A or the second TLP checker 161B for path 163B. The TLP checkers are used to check for TLP errors.

Steering module 159 maintains a counter 204, shown as NEXT_RCV_SEQ counter. Counter 204 is used to maintain a TLP sequence count. The sequence count is a field within a TLP header. The TLP sequence count is maintained to determine if a TLP is valid. For example, a TLP sequence count at time t=1 may be 5, then the sequence count for a next TLP should be 6. However, if the sequence count for the next TLP is 7 then either an out of order TLP is received or a duplicate TLP is received. The TLP checker can use this information to validate or invalidate a TLP. If the TLP is invalidated, then it is discarded, as described above with respect to FIG. 1F DLP 150B may also include a DLL processor 206 that is used to process DLL packets. Details for DLL packet processing are not germane to the embodiments disclosed herein.

Figure 2B:
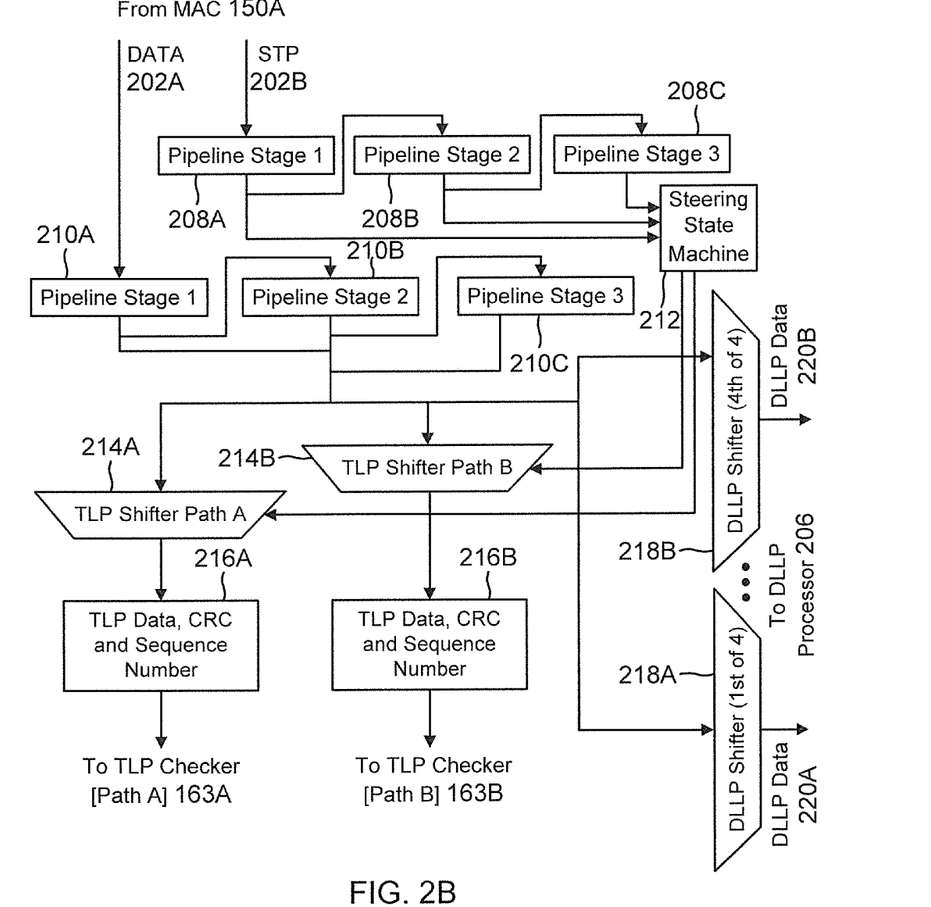
FIG. 2B shows a block diagram of the steering module of FIG. 2B.

FIG. 2B shows an example of steering module 159 having a steering state machine 212 for routing TLPs to path 163A or 163B, according to one embodiment. TLP Data 202A received from MAC 150A may be stored at a plurality of locations, shown as pipeline stage 1 210A-pipeline stage 3 210C. The start of a TLP (shown as STP 202B) may be stored in a different pipeline shown as 208A-210C. The steering machine 159 selects TLP data, CRC and TLP sequence number (shown as 216A and 216B) from the pipelines and sends it via TLP shifters 214A and 214B for the TLP checkers for each path 163A and 163B. The state machine 212 sends a first TLP via path 163A and a second TLP via path 163B. The TLP checkers then validate or invalidate the TLPs. The TLP with the validation data are then sent to TL 150C, as described above in detail.

The system of FIG. 2B also includes shifters 218A and 218B that are used to provide DLLPs 220A and 220B to the DLLP processor 206 for processing. As mentioned above DLL packet processing is not described in detail.

Figure 3A:
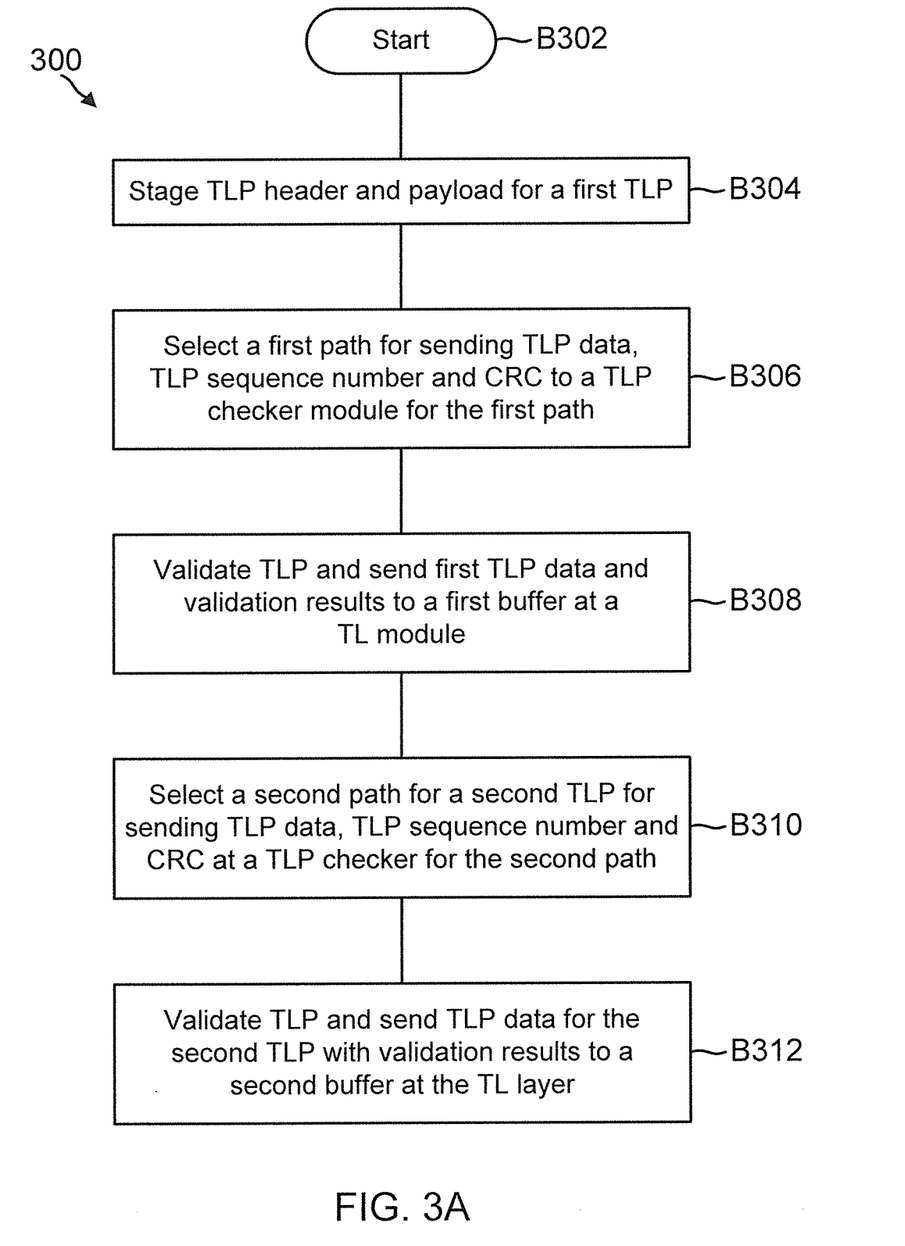
FIGS. 3A-3B show process flow diagrams of various embodiments of the present disclosure.

FIG. 3A shows a process 300 for pre-processing TLPs at DLL 150B, according to one embodiment. The process begins at block B302, when a first TLP is received from MAC 150A. The TLP includes a TLP header (or a STP 202B) (FIG. 2B) and TLP payload 202A (FIG. 2B). In block B302, the DLL 150B stages the TLP header and the TLP data at a plurality of pipeline stages 208A-208C and 210A-210C. In block B306, the steering module 159 selects one of the two paths to route the TLP data. As an example, path 163A may be selected for the first TLP. TLP data 202A, CRC and a TLP sequence number (jointly shown as 216A) is sent to the TLP checker 161A.

In block B308, the TLP checker 161A validates the first TLP and sends the first TLP payload, TLP header and validation results to the first SNF 162A. While the first TLP is being processed, a second TLP may be received. In block B310, the steering module 159 selects the second path 163B for the second TLP. The second TLP data, second TLP header, and the second TLP sequence number are provided to TLP checker 161B.

In block B312, the TLP checker 161B validates the second TLP and sends the validation results with the second TLP payload and second TLP header to the second SNF 163B for further processing. The TLP processing by TL 150C is now described with respect to the process 314 shown in FIG. 3B.

Figure 3B:
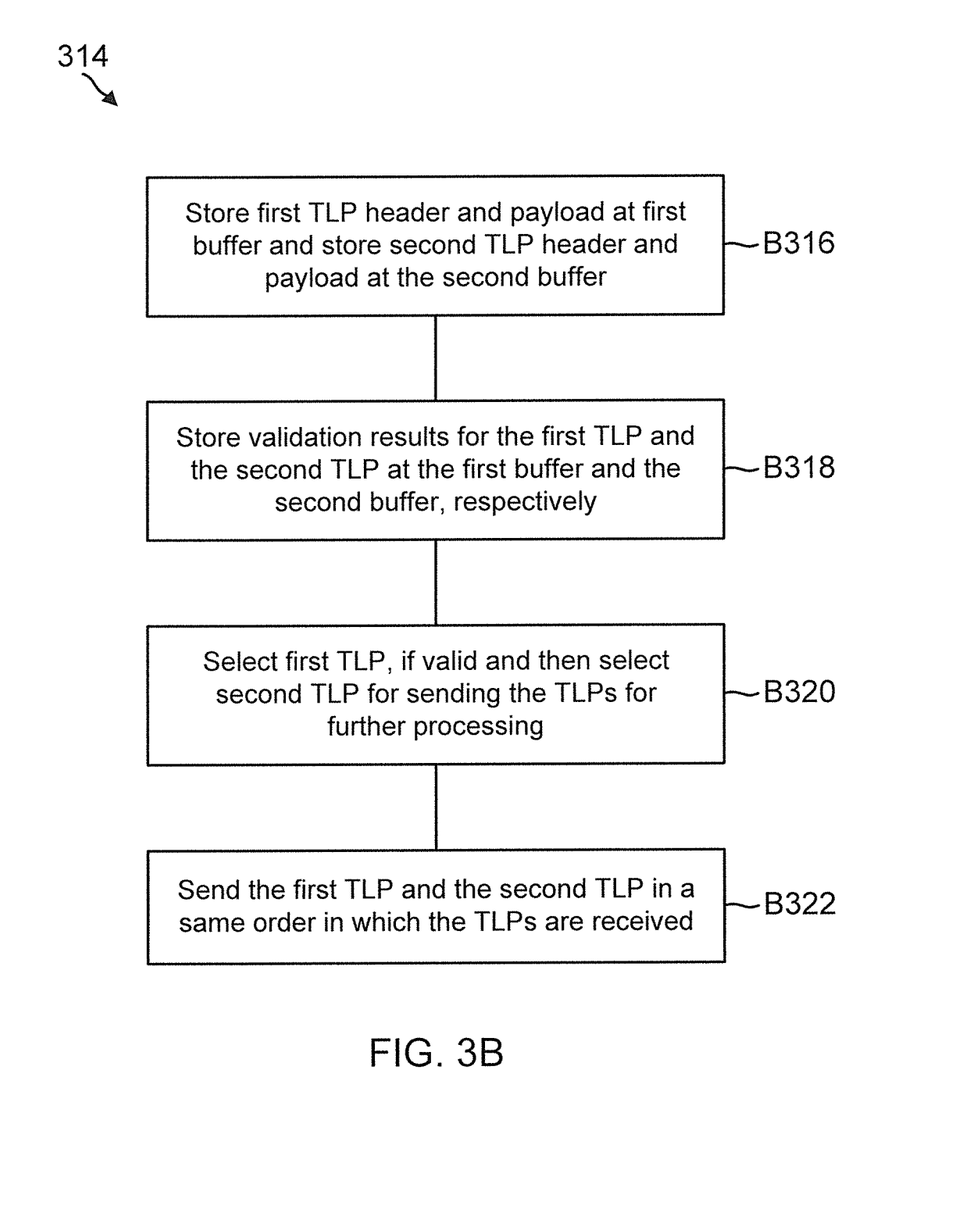

In block B316, the TLP header for the first TLP is stored at the header FIFO 170A, while the TLP payload for the first TLP is stored at the payload FIFO 170B. Simultaneously, the TLP header and payload for the second TLP are also stored at header FIFO and the payload FIFO of the second SNF 162B.

In block B318, the validation results for the first and the second TLPs are also stored at the status FIFO 170C. It is noteworthy that blocks B316 and B318 may take place simultaneously.

In block B320, arbiter 176 selects the first TLP from SNF 162A, if the TLP is valid. If the TLP is not valid, it is discarded and in the same clock cycle, the TLP from SNF 162B is selected by arbiter 176. When both the first and second TLPs are valid, then first SNF 162A is selected, the first TLP is read and send to TLP decoder 166 in block B322. Thereafter, arbiter 176 using a ping-pong methodology selects the second SNF 162 and the second TLP is sent after the first TLP. This maintains the order in which the TLPs are received by TL 150C. Because multiple paths are used both at DLL 159B and TL 150C, more TLPs can be processed, which improves the overall throughput rate at which TLPs are processed by adapter 114.

Figure 4:
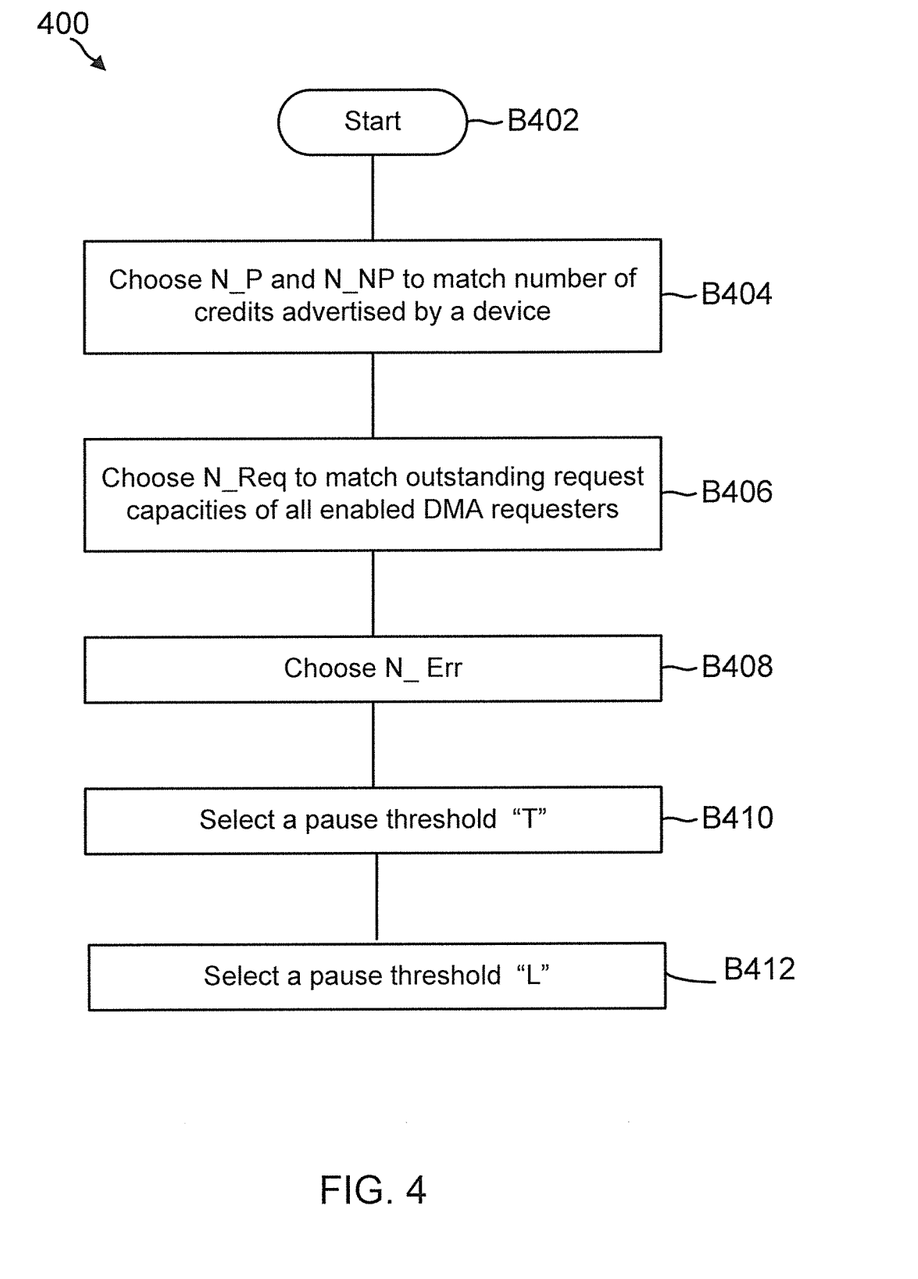
FIG. 4 shows a process flow for determining a buffer size, according to one embodiment.

FIG. 4 shows a process for determining a size for SNF buffers 162A and 162B, according to one embodiment. The process begins in block B402. In one embodiment, the size of buffers 162A/162B may be based on a plurality of parameters, for example, the buffer size L may be based on the following Equation (I):

$$L = X1*T + N\_P/X2 + X3*N\_NP/X4 + N\_Req/X5 + N\_Err/X6 \qquad (I)$$

L=Buffer Size

N_P=Number of P Request credits. The term credit as used herein means the amount of credit advertised by a device (for example, adapter 116) (or module) for flow control to avoid overflow conditions.

N_NP=Number of NP Request credits.

N_Req=Number of outstanding Requests which the DMA requestors of a device (for example, adapter 116) are capable of issuing.

N_Err=Number of error TLPs allowed

T=Pause threshold. The pause threshold is set to avoid overflow and underflow conditions. Initially, the pause threshold may be set to a default value based on certain assumptions for information flow and the environment in which adapter 116 may be deployed. In one embodiment, the pause threshold T should be greater than or equal to the size of a largest TLP, which may be based on a maximum payload that can be supported by the adapter 116. The pause threshold may also be based on overall traffic patterns that depend on the interaction between adapter 116 and the host system. For example, if adapter 116 rarely receives large size packets, then the pause threshold may be equal to one maximum size TLP. In another environment, when adapter 116 frequently receives large packets, then the pause threshold may be higher. The pause threshold may be changed, as described below with respect to FIG. 5.

X1, X2, X3, X4, X5 and X6 are parameters that may be adjusted based on simulation and operating conditions. As an example, X1 may be equal to 2, X2 may be equal to 4, X3 may be equal to 3, X4 may be equal to 8, X5 may be equal to 2 and X6 may be equal to 4.

Referring back to FIG. 4, in block B404, N_P and N_NP are selected. These values may be based on the size of P buffer 171B and NP buffer 171C, described above with respect to FIG. 1D.

In block B406, a value for N_Req is chosen. As an example, this value may be based on a number of DMA requestors in DMA module 119 and a request capacity for each requestor, which defines a number of requests each DMA requestor is permitted to generate for sending information via link 115.

In block B408, a value for N_err is chosen. The N_err value is used as a safety margin and may vary based on operating environment.

In block B410, the pause threshold value T is selected to avoid overflow conditions. Thereafter, the buffer size L is determined in block B412, based on Equation I. The process then ends.

Figure 5:
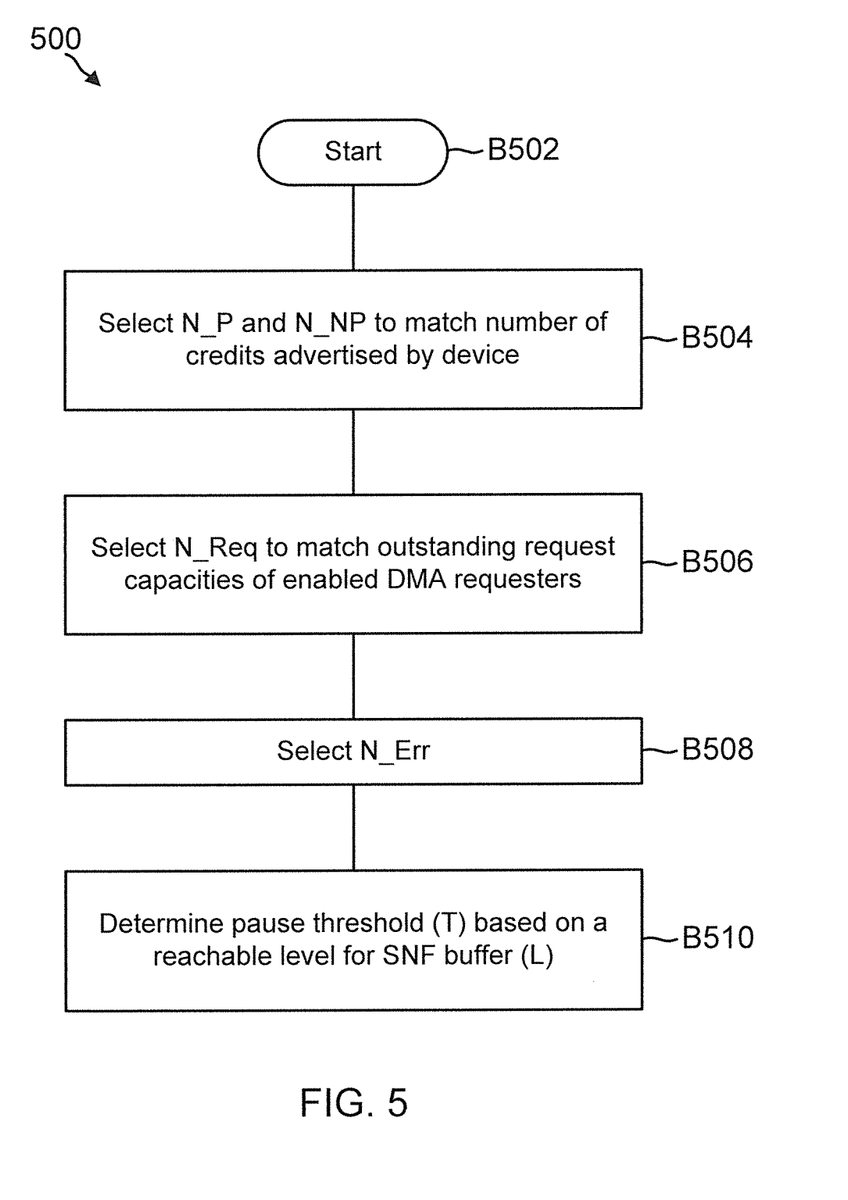
FIG. 5 shows a process for determining a buffer threshold, according to one embodiment.

The pause threshold value T may be changed after adapter 116 has been deployed. The threshold value may be changed based on laboratory testing or in the field where adapter 116 is being used at any given time. FIG. 5 shows a process 500 for modifying the pause threshold value, based on Equation (I) described above. The process begins in block B502. In block B504, select N_P and N_NP to match the number of credits advertised for posted and non-posted requests. Adapter 116 may have to be reset to change these values.

In block B506, select N_Req to match the outstanding request capacities of enabled DMa requesters. In block B508, N_Err is selected. Using equation I, the pause threshold T is determined in block B510.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A device coupled to a computing device and a network device, comprising:
    a first module for receiving a first packet and a second packet via a same single data path from the computing device;
    a second module for receiving the first packet at a first buffer via a first path and the second packet at a second buffer via a second path;
    wherein the first buffer stores a header, a payload and validation results for the first packet and the second buffer stores a header, a payload and validation results for the second packet;
    wherein the first module uses a steering mechanism to steer the first packet in the first path and the second packet in the second path; and
    wherein the second module uses an arbitration module to select the first packet and the second packet for maintaining an order in which the first packet and the second packet are received and for sending the first packet and the second packet to a third module for further processing.

2. The device of claim 1, wherein the first module is a data link layer (DLL).

3. The device of claim 1, wherein the second module is a transaction layer.

4. The device of claim 3, wherein the first packet and the second packet are transaction layer packets.

5. The device of claim 1, wherein the steering mechanism uses a state machine that selects the first path for the first packet and the second path for the second packet.

6. The device of claim 5, wherein the steering mechanism sends the first packet to a first checker module for the first path and the second packet to a second checker module for the second path.

7. The device of claim 6, wherein the first checker module validates the first packet and sends validation results with the first packet to the first module.

8. The device of claim 6, wherein the second checker module validates the second packet and sends validation results with the second packet to the second module.

9. A machine implemented method for a device coupled to a computing device and a network device, comprising:
    receiving a first packet and a second packet by a first module of the device via a same single data path from the computing device;
    receiving the first packet at a first buffer via a first path and the second packet at a second buffer via a second path of a second module of the device;
    steering the first packet in the first path and the second packet in the second path; and
    selecting the first packet and the second packet for maintaining an order in which the first packet and the second packet are received and for sending the first packet and the second packet to a third module for further processing; and wherein the first buffer stores a header, a payload and validation results for the first packet and the second buffer stores a header, a payload and validation results for the second packet.

10. The method of claim 9, wherein the first module is a data link layer (DLL).

11. The method of claim 9, wherein the second module is a transaction layer.

12. The method of claim 11, wherein the first packet and the second packet are transaction layer packets.

13. The method of claim 9, wherein a steering mechanism using a state machine selects the first path for the first packet and the second path for the second packet.

14. The method of claim 13, wherein the steering mechanism sends the first packet to a first checker module for the first path and the second packet to a second checker module for the second path.

15. The method of claim 14, wherein the first checker module validates the first packet and sends validation results with the first packet to the first module.

16. The method of claim 14, wherein the second checker module validates the second packet and sends validation results with the second packet to the second module.

17. A non-transitory, machine readable storage medium storing executable instructions, which when executed by a machine, causes the machine to perform a method, the method comprising:
- receiving a first packet and a second packet by a first module of the device via a same single data path from the computing device;
- receiving the first packet at a first buffer via a first path and the second packet at a second buffer via a second path of a second module of the device;
- steering the first packet in the first path and the second packet in the second path; and
- selecting the first packet and the second packet for maintaining an order in which the first packet and the second packet are received and for sending the first packet and the second packet to a third module for further processing; and
- wherein the first buffer stores a header, a payload and validation results for the first packet and the second buffer stores a header, a payload and validation results for the second packet.

18. The storage medium of claim 17, wherein the first module is a data link layer (DLL) and the second module is a transaction layer.

* * * * *

UNITED STATES PATENT AND TRADEMARK OFFICE
CERTIFICATE OF CORRECTION

PATENT NO. : 8,977,786 B1
APPLICATION NO. : 13/954661
DATED : March 10, 2015
INVENTOR(S) : Sonksen et al.

Page 1 of 1

It is certified that error appears in the above-identified patent and that said Letters Patent is hereby corrected as shown below:

In the Specification

In column 1, line 42, delete "2B; and" and insert -- 2B; --, therefor.

In column 6, line 4, delete "ping-pang" and insert -- ping-pong --, therefor.

In column 6, line 66, delete "168E" and insert -- 168B --, therefor.

In column 7, line 56, delete "1F" and insert -- 1F. --, therefor.

In column 9, line 10, delete "allowed" and insert -- allowed. --, therefor.

Signed and Sealed this
Twenty-eighth Day of July, 2015

Michelle K. Lee
*Director of the United States Patent and Trademark Office*